US010424771B2

(12) United States Patent
Dirscherl et al.

(10) Patent No.: US 10,424,771 B2
(45) Date of Patent: Sep. 24, 2019

(54) BATTERY CELL HAVING A METALLIC HOUSING, AND METHOD FOR PRODUCING IT, AND BATTERY

(71) Applicant: Robert Bosch GmbH, Stuttgart (DE)

(72) Inventors: Florian Dirscherl, Bischberg (DE); Holger Reinshagen, Bamberg (DE); Rudi Kaiser, Bamberg (DE); Silvan Poller, Neisseaue ot Kaltwasser (DE)

(73) Assignee: Robert Bosch GmbH, Stuttgart (DE)

( * ) Notice: Subject to any disclaimer, the term of this patent is extended or adjusted under 35 U.S.C. 154(b) by 310 days.

(21) Appl. No.: 15/381,324

(22) Filed: Dec. 16, 2016

(65) Prior Publication Data
US 2017/0179450 A1 Jun. 22, 2017

(30) Foreign Application Priority Data

Dec. 17, 2015 (DE) .................. 10 2015 225 705

(51) Int. Cl.
*H01M 2/12* (2006.01)
*H01M 2/02* (2006.01)
*H01M 10/0525* (2010.01)

(52) U.S. Cl.
CPC ......... *H01M 2/1235* (2013.01); *H01M 2/024* (2013.01); *H01M 2/027* (2013.01); *H01M 2/0262* (2013.01); *H01M 2/0277* (2013.01); *H01M 2/0285* (2013.01); *H01M 2/0287* (2013.01); *H01M 10/0525* (2013.01); *H01M 2200/20* (2013.01); *H01M 2220/20* (2013.01); *Y02E 60/122* (2013.01); *Y02P 70/54* (2015.11)

(58) Field of Classification Search
CPC .. H01M 2/1235; H01M 2/024; H01M 2/0262; H01M 2/027; H01M 2/0277; H01M 2/0285; H01M 2/0287; H01M 10/0525
See application file for complete search history.

(56) References Cited

U.S. PATENT DOCUMENTS

| 4,127,702 A * | 11/1978 | Catanzarite ............. H01M 2/08 429/181 |
| 2007/0224500 A1 | 9/2007 | White et al. |
| 2010/0248014 A1 | 9/2010 | Huang et al. |
| 2014/0295239 A1 | 10/2014 | Haug |

FOREIGN PATENT DOCUMENTS

DE 102011076919 12/2012

* cited by examiner

*Primary Examiner* — Jimmy Vo
(74) *Attorney, Agent, or Firm* — Michael Best & Friedrich LLP

(57) ABSTRACT

A battery cell, in particular lithium-ion battery cell. The battery cell has a metallic housing (2), an electrode assembly (3) being received in the metallic housing (2). The metallic housing (2) has a first housing element (4), which is connected electrically to a positive pole (8) of the electrode assembly (3), and a second housing element (5), which is connected electrically to a negative pole (9) of the electrode assembly (3). The battery cell (3) also has at least one insulation element (10), which is configured for insulating the two housing elements (4, 5) from one another electrically and is arranged between the two housing elements (4, 5). The at least one insulation element (10) has at least one barrier layer (6).

19 Claims, 6 Drawing Sheets

BATTERY CELL HAVING A METALLIC HOUSING, AND METHOD FOR PRODUCING IT, AND BATTERY

BACKGROUND OF THE INVENTION

The invention proceeds from a battery cell having a metallic housing. The subject matter of the present invention is also a method for producing a battery cell of this type. Furthermore, the invention relates to a battery having a battery cell of this type.

It is known from the prior art that batteries, such as, in particular, lithium-ion batteries, consist at least of a battery module or advantageously also of a plurality of battery modules. Furthermore, a battery module additionally preferably has a multiplicity of individual battery cells which are connected among one another to form the battery module. To this end, the individual battery cells in each case have a positive and a negative voltage tap and are connected to one another in series or parallel by means of cell connectors. The capacity and/or current strength of the battery module is increased in the case of a parallel connection of the individual battery cells to one another, whereas the voltage of the battery module is increased in the case of a serial connection of the individual battery cells to one another.

Here, the positive and negative voltage tap of an individual battery cell is arranged on an outer side of the housing of the battery cell, which outer side is adjacent with respect to a surrounding area, and is additionally connected electrically to a positive and negative pole, respectively, of an electrode assembly which is received in an interior of the battery cell. As a result, the energy density of a battery module which can be realized is reduced on account of the installation space which is required by the voltage taps and their connection by means of cell connectors.

The prior art, for example DE 10 2011 076 919 A1, has disclosed a battery cell having a housing with at least one electrode assembly which is arranged in the housing. Here, the housing has two housing elements which substantially separate the electrode assembly from the surrounding area. A first housing element is connected electrically to a positive pole of the electrode assembly, and a second housing element is connected electrically to a negative pole of the electrode assembly. Furthermore, an insulation element is arranged between the first housing element and the second housing element. Therefore, the battery cell can be contacted electrically on the first housing element and on the second housing element, as a result of which the energy density which can be realized can be increased by way of an omission of separate voltage taps which are arranged on an outer side of the housing, which outer side is adjacent with respect to the surrounding area.

The battery cell and the method of the invention have the advantage that at least one insulation element which is arranged between a first housing element and a second housing element of the metallic housing for electric insulation has at least one barrier layer, and the at least one barrier layer reduces, in particular, a diffusion of solvent of the electrolyte and of moisture through the insulation element. As a result, an electrode assembly which is received in the interior of the metallic housing can be protected, in particular, in an improved manner against influences from the surrounding area of the battery cell in comparison with battery cells which are known from the prior art.

SUMMARY OF THE INVENTION

According to the invention, a battery cell, in particular a lithium-ion battery cell, having a metallic housing is provided. Here, an electrode assembly is received in the metallic housing. Furthermore, the metallic housing has a first housing element which is connected electrically to a positive pole of the electrode assembly, and a second housing element which is connected electrically to a negative pole of the electrode assembly. Furthermore, the battery cell has at least one insulation element which is configured for electric insulation of the two housing elements from one another and is arranged between the two housing elements. Here, the at least one insulation element has at least one barrier layer.

The first housing element, the second housing element and the insulation element which is arranged between the first housing element and the second housing element for electric insulation of the housing elements from one another preferably form an interior space which receives the electrode assembly and, in particular, is closed off with respect to a surrounding area of the battery cell, as a result of which the electrode assembly which is received in the interior space is separated from the surrounding area. As a result, the electrode assembly can be separated from a surrounding area of the battery cell, in particular, in such a way that the electric voltage of a positive pole of the electrode assembly can be tapped off only via the first housing element, and the electric voltage of a negative pole of the electrode assembly can be tapped off only via the second housing element. Furthermore, the arrangement of at least one barrier layer reduces an undesired diffusion through the insulation element.

Since, in particular, the first housing element is connected electrically to the positive pole of the electrode assembly and the second housing element is connected electrically to the negative pole of the electrode assembly, the positive voltage of the electrode assembly can be tapped off on the first housing element and the negative voltage can be tapped off on the second housing element. As a result, it is necessary, however, that the first housing element and the second housing element are insulated electrically from one another by way of the arrangement of the insulation element. Furthermore, the insulation element can also be configured for electric insulation of the metallic housing with respect to the surrounding area, in particular with respect to a cooling plate.

Here, the first housing element and the second housing element are configured from an electrically conductive material. In particular, the first housing element and the second housing element can be configured from a metallic material, such as from aluminum or a steel/nickel mixture. Furthermore, the first housing element and the second housing element can be configured from nickel-plated steel and/or from nickel-plated aluminum.

In particular, the insulation element can mechanically connect the first housing element and the second housing element to one another, in particular to form a positively locking connection of the first housing element and the second housing element. Furthermore, the insulation element can be configured, in particular via the selection of a material with a suitable modulus of elasticity, in such a way that loads which act on the housing elements can be compensated for, without cracks being produced in the insulation element or the battery cell being damaged.

It is expedient that at least one barrier layer is arranged on an outer face of the metallic housing. Here, in particular, a surface of the metallic housing which is arranged adjacently with respect to a surrounding area of the battery cell is called an outer face of the metallic housing. Here, the at least one barrier layer is arranged, in particular, on the outer face of the metallic housing in such a way that a diffusion can be reduced at connecting points between the metallic housing and the insulation element. In particular, it is also possible to this end that the at least one barrier layer is arranged continuously on an outer side of the insulation element and on an outer face of the metallic housing, in order to protect connecting points. As a result, it is possible to further reduce a diffusion of solvent or moisture through the at least one insulation element.

It is advantageous if the at least one barrier layer is configured from a plastic/aluminum composite. The at least one barrier layer is preferably configured from a polyethylene/aluminum composite. In particular, the barrier layer is configured here as a three-layer composite which comprises a carrier layer, a barrier and a heat sealing layer, the barrier being arranged between the carrier layer and the heat sealing layer. The carrier layer can be configured, in particular, from polyethylene, polypropylene, polyamide, polyphthalamide, polyether sulfone, polyethylene imine, polyphthalate or polyethylene terephthalate and is arranged directly on the at least one insulation element. The barrier can be configured, in particular, from an aluminum foil. Furthermore, the barrier can be configured as an aluminum or ceramic layer which is vapor deposited onto the carrier layer. The barrier serves to prevent or to reduce diffusion through the barrier layer. The heat sealing layer is configured, in particular, from polyethylene and serves to produce a connection between the barrier layer and the insulation element by way of heat sealing. In particular, the carrier layer is configured from polyethylene, the barrier is configured from aluminum and the heat sealing layer is configured from polyethylene, with the result that a three-layer composite is configured which is called a PE/AL/PE barrier layer. Furthermore, the barrier layer or the barrier can be configured as a silicon oxide layer. The three-layer composite preferably comprises further layers, in particular for increasing the mechanical stability, it being possible for the three-layer composite to comprise, in particular, two further layers and therefore to be a five-layer composite. It is to be noted already at this point that, as described later, a connection by way of adhesive bonding or adhesive tapes is also possible.

According to one aspect of the invention, the at least one barrier layer is arranged on an outer face of the at least one insulation element, which outer face is adjacent with respect to a surrounding area of the battery cell. The at least one insulation element has, in particular, a plurality of surfaces. Here, the plurality of surfaces comprises at least one surface which is arranged adjacently with respect to the first housing element, at least one surface which is arranged adjacently with respect to the second housing element, at least one surface which is arranged adjacently with respect to the interior space which receives the electrode assemblies, and at least one surface which is arranged adjacently with respect to the surrounding area of the battery cell, only a surface which is arranged adjacently with respect to the surrounding area of the battery cell being called an outer face of the at least one insulation element. The arrangement of the at least one barrier layer on an outer face of the at least one insulation element, which outer face is adjacent with respect to the surrounding area of the battery cell, has the advantage that said outer face is accessible from the surrounding area, and therefore a simple arrangement of the at least one barrier layer is possible. It goes without saying that the at least one barrier layer can also be arranged on a surface of the at least one insulation element, which surface is arranged adjacently with respect to the first housing element, the second housing element or the interior space of the battery cell. Furthermore, in each case one barrier layer can also be configured on a plurality of surfaces of the at least one insulation element, which barrier layers can also, in particular, be configured in one piece.

According to another aspect of the invention, the at least one barrier layer is integrated into the at least one insulation element. As a result, the assembly outlay during the production of the battery cell can be reduced, since the arrangement of the barrier layer during the assembly is dispensed with. In particular, the at least one barrier layer can be integrated into an interior of the at least one insulation element. In other words, this means that a barrier layer which is integrated into an interior of the at least one insulation element is at least partially invisible from the outside. Here, it is also possible, in particular, to integrate a plurality of barrier layers which can be arranged next to one another into the insulation element.

The first housing element and/or the second housing element are/is advantageously of half shell-shaped configurations. It is also possible here that the first housing element and the second housing element are of identical configuration.

In particular, the first housing element of half shell-shaped configuration has a first end face, a first inner face and a first outer face. Here, a surface of the first housing element which is arranged adjacently with respect to the interior space which receives the electrode assembly is called a first inner face. Here, a surface of the first housing element which is arranged adjacently with respect to the surrounding area of the battery cell is called a first outer face. Here, a surface of the first housing element which is arranged adjacently with respect to the first inner face and the first outer face is called a first end face, the first end face being arranged, in particular, between the first inner face and the first outer face. In particular, the second housing element of half shell-shaped configuration has a second end face, a second inner face and a second outer face. Here, a surface of the second housing element which is arranged adjacently with respect to the interior space which receives the electrode assembly is called a second inner face. Here, a surface of the second housing element which is arranged adjacently with respect to the surrounding area of the battery cell is called a second outer face. Here, a surface of the second housing element which is arranged adjacently with respect to the second inner face and the second outer face is called a second end face, the second end face being arranged, in particular, between the second inner face and the second outer face. In particular, the first end face and the second end face are arranged adjacently with respect to one another and are separated from one another only by way of the at least one insulation element.

The at least one insulation element expediently covers the first and second end face completely and, furthermore, covers at least one inner face and at least one outer face of the first and the second housing element at least partially. As a result, a reliable electric insulation of the two housing elements from one another can be ensured.

It is expedient that the at least one insulation element is of H-shaped or T-shaped configuration. This has the advantage that a reliable electric insulation of the first housing element and the second housing element from one another is possible and, at the same time, a mechanically reliable connection of the first housing element to the second housing element is possible.

It is advantageous if the at least one insulation element has at least one predetermined break point. Here, the predetermined break point is set up to fracture above a pressure which prevails within the metallic housing. In particular, the predetermined break point fractures above a pressure of 6 bar. This has the advantage that controlled bursting of the battery cell can be made possible.

In particular, the electrode assembly which is preferably received in an interior space which is configured by the first and the second housing element and the at least one insulation element is configured as an electrode stack or as an electrode winding.

It goes without saying, furthermore, that all developments and advantages which are mentioned in conjunction with the described battery cell according to the invention also apply in conjunction with the method according to the invention and/or the battery.

Furthermore, the invention relates to a method for producing an above-described battery cell, in particular a lithium-ion battery cell, having a metallic housing which has a first housing element and a second housing element. Here, an electrode assembly is received in the metallic housing in such a way that the first housing element is connected electrically to a positive pole of the electrode assembly, and that the second housing element is connected electrically to a negative pole of the electrode assembly. At least one insulation element is arranged between the two housing elements. A barrier layer is arranged on an outer face of the at least one insulation element and/or on an outer face of the metallic housing.

It is advantageous if the barrier layer is connected to the outer face of the at least one insulation element and/or the outer face of the metallic housing by way of heat sealing. It is advantageous here, in particular, if the barrier layer is configured as an above-described three-layer composite which comprises at least three layers and is preferably configured as a PE/AL/PE barrier layer, further layers being possible in order to increase the mechanical stability.

Furthermore, it is advantageous if the barrier layer is connected to the outer face of the at least one insulation element and/or the outer face of the metallic housing by way of adhesive bonding. It is advantageous here, in particular, if the adhesive bonding takes place via two-component epoxy adhesive systems, adhesive systems which can be activated thermally, or adhesive systems which can be activated by way of UV radiation.

Furthermore, it can be advantageous if the barrier layer is configured as an adhesive tape which has at least one barrier for limiting the diffusion. As a result, a connection can be produced in a simple way.

A battery cell according to the invention can be used for batteries in mobile use, in particular in electric vehicles and E-bikes, and for batteries for application in stationary operation.

BRIEF DESCRIPTION OF THE DRAWINGS

Exemplary embodiments of the invention are shown in the drawings and are explained in greater detail in the following description.

In the drawings.

DETAILED DESCRIPTION

Figure 1:
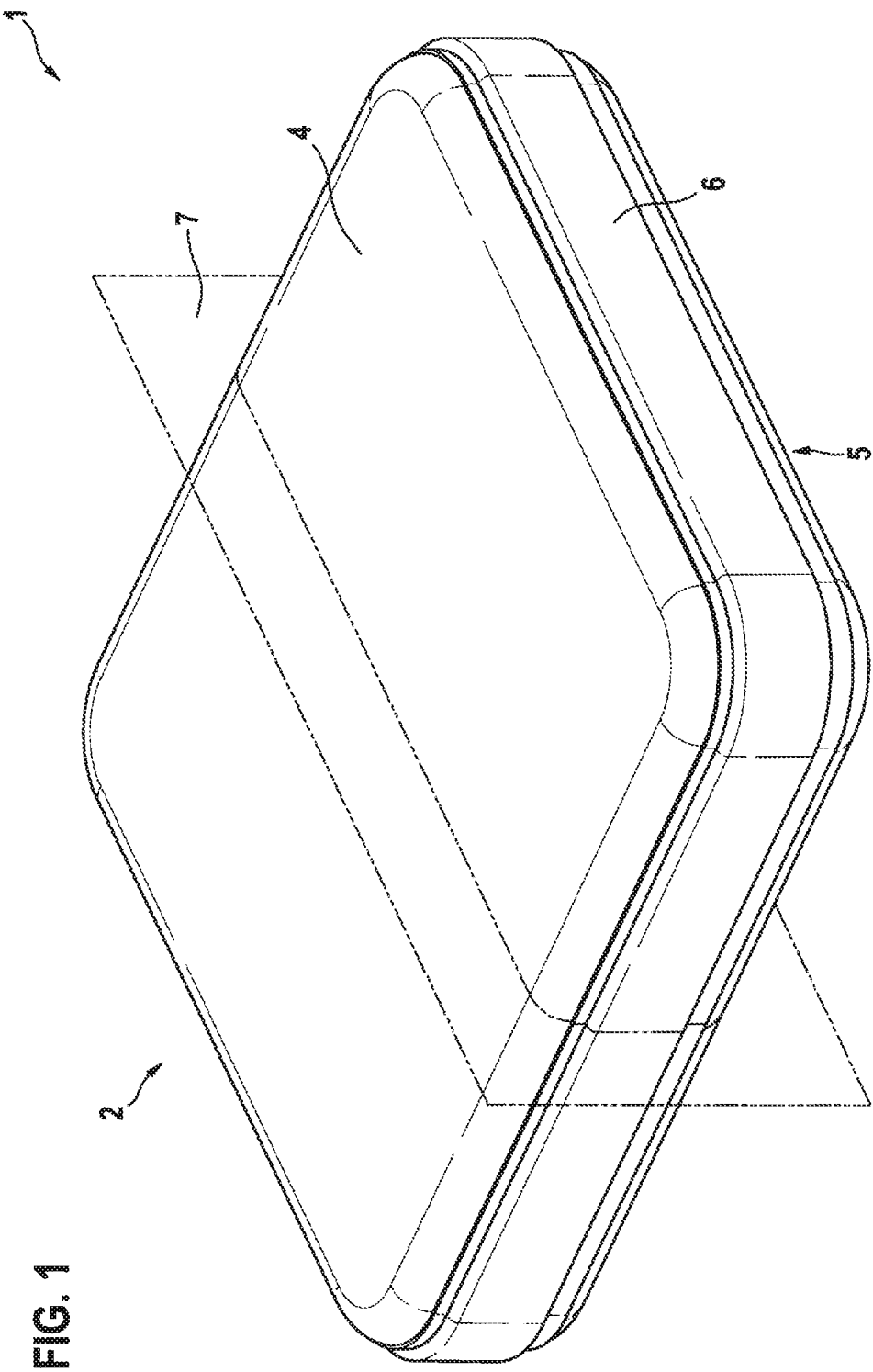
FIG. 1 shows one embodiment of a battery cell according to the invention in a perspective view.

FIG. 1 shows a perspective view of one embodiment of a battery cell 1 according to the invention.

The battery cell 1 has a metallic housing 2, in which an electrode assembly 3 which cannot be seen in FIG. 1 is received.

Furthermore, the metallic housing 2 has a first housing element 4 and a second housing element 5. The first housing element 4 is connected electrically to a positive pole 8 (cannot be seen in FIG. 1) of the electrode assembly 3 (likewise cannot be seen). The second housing element 5 is connected electrically to a negative pole 9 (cannot be seen in FIG. 1) of the electrode assembly 3 (likewise cannot be seen).

The first housing element 4 and the second housing element 5 of the metallic housing 2 of the battery cell 1 which is shown in FIG. 1 are of half shell-shaped configuration.

Furthermore, a barrier layer 6 can be seen in FIG. 1, which barrier layer 6 is preferably arranged on outer faces of the metallic housing 2 and an insulation element 10, which outer faces will be described later.

The metallic housing 2, the first housing element 4 and the second housing element 5 which are, in particular, of half shell-shaped configuration, the electrode assembly 3 and the configuration and the arrangement of the barrier layer 6 will be described in greater detail using the following FIGS. 2 to 6. Here, FIGS. 2 to 6 in each case show embodiments of battery cells 1 according to the invention which are shown in a sectional illustration according to the plane 7 which is shown in FIG. 1. In the sectional illustrations which are shown, however, an illustration of the entire section has been dispensed with in each case for reasons of clarity.

Figure 2:
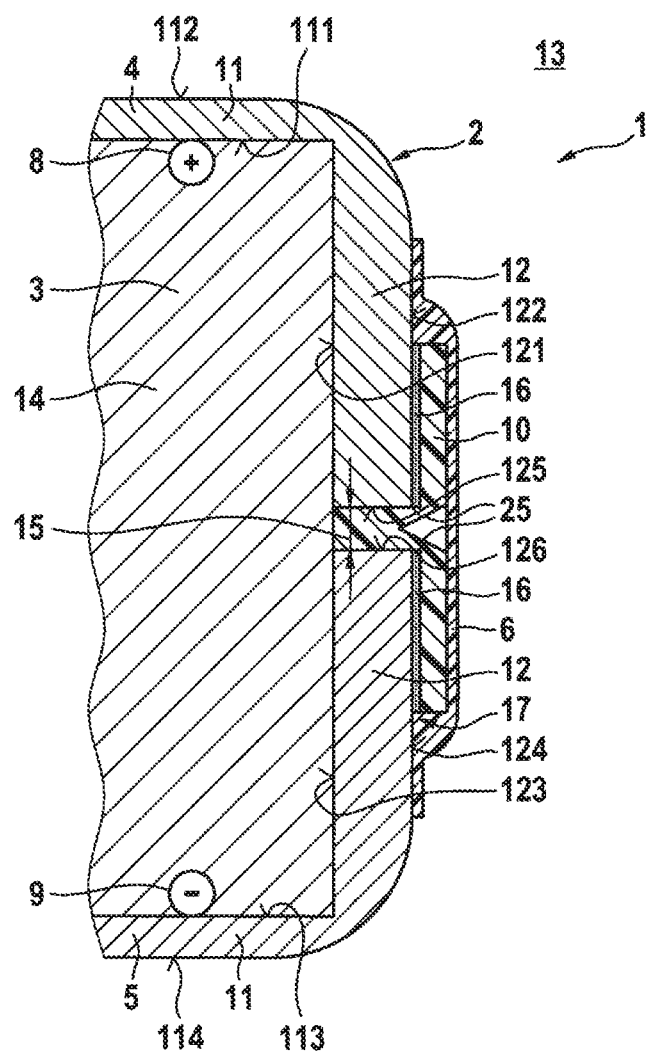
FIG. 2 shows a first embodiment of a battery cell according to the invention in a sectional illustration.

FIG. 2 shows a first embodiment of a battery cell 1 according to the invention in a sectional illustration according to the plane 7 which is shown in FIG. 1.

Here, the electrode assembly 3 which can now be seen in FIG. 2 can be configured as an electrode winding or as an electrode stack. Furthermore, the electrode assembly 3 has at least one positive pole 8 and at least one negative pole 9. Here, the at least one positive pole 8 is connected electrically to the first housing element 4. Here, the at least one negative pole 9 is connected electrically to the second housing element 5. As a result, the first housing element 4 can configure the positive pole of the entire battery cell 1, and the second housing element 5 can configure the negative pole of the entire battery cell 1, with the result that additional voltage taps on the metallic housing 2 of the battery cell 1 can be dispensed with. It is necessary for a configuration of this type of the battery cell 1, however, that the first housing element 4 and the second housing element 5 are insulated electrically from one another. To this end, the battery cell 1 has at least one insulation element 10 which is configured for insulating the two housing elements 4, 5 from one another electrically. The insulation element 10 is arranged between the two housing elements 4, 5.

The configuration of the first housing element 4 and the second housing element 5 is to be described again in greater detail at this point. As has already been stated, the first housing element 4 and the second housing element 5 are of half shell-shaped configuration. A housing element 4, 5 of half shell-shaped configuration of this type substantially has a first housing wall 11 which forms a floor and at least one second housing wall 12 which forms a side wall. In the case of first and/or second housing elements 4, 5 of prismatic configuration, a first and/or second housing element 4, 5 of this type has four second housing walls 12 which are arranged, in particular, at a right angle with respect to one another and at a right angle with respect to the first housing wall 11 which forms the floor. The first and/or second housing element 4, 5 which is of half shell-shaped configuration is open on the side which lies opposite the floor and does not have a further housing wall. In other words, this means that the interior of the first and/or second housing element 4, 5 of half shell-shaped configuration is accessible from the side which lies opposite the floor. As can be seen, in particular, from FIG. 1 and FIG. 2, the housing walls can be connected to one another via rounded connecting points.

The first housing wall 11 of the first housing element 4 which forms the floor has an inner face 111 and an outer face 112. Furthermore, the second housing wall 12 of the first housing element 4 has a first inner face 121 and a first outer face 122. Furthermore, the second housing wall 12 has a first end face 125. The inner face 111 and the first inner face 121 are arranged in each case adjacently with respect to an interior space 14 of the metallic housing 2, which interior space 14 receives the electrode assembly 3. The outer face 112 and the first outer face 122 are arranged in each case adjacently with respect to a surrounding area 13 of the metallic housing 2.

The first end face 125 is arranged adjacently with respect to the first inner face 121 and the first outer face 122; in particular, the first end face 125 is arranged between the first inner face 121 and the first outer face 122. In particular, the first end face 125 is to denote a transition region of the second housing wall 12 of the first housing element 4, which transition region is arranged directly adjacently neither with respect to the surrounding area 13 nor with respect to the interior space 14.

The first housing wall 11 of the second housing element 5, which first housing wall 11 forms the floor, has an inner face 113 and an outer face 114. Furthermore, the second housing wall 12 of the second housing element 5 has a second inner face 123 and a second outer face 124. Furthermore, the second housing wall 12 has a second end face 126. The inner face 113 and the second inner face 123 are arranged in each case adjacently with respect to the interior space 14 of the metallic housing 2, which interior space 14 receives the electrode assembly 3. The outer face 114 and the second outer face 124 are arranged in each case adjacently with respect to a surrounding area 13 of the metallic housing 2.

The second end face 126 is arranged adjacently with respect to the second inner face 123 and the second outer face 124; in particular, the second end face 125 is arranged between the second inner face 123 and the second outer face 124. In particular, the second end face 126 is to denote a transition region of the second housing wall 12 of the second housing element 5, which transition region is arranged directly adjacently neither with respect to the surrounding area 13 nor with respect to the interior space 14.

As can be seen from FIGS. 1 and 2, the first housing element 4 and the second housing element 5 of the metallic housing 2 are arranged such that the openings of the two housing elements 4, 5 are arranged so as to face one another and, in particular, the two end faces 125, 126 are arranged adjacently with respect to one another and are separated from one another only by way of the at least one insulation element 10. As a result, the first housing walls 11 and the second housing walls 12 configure the interior space 14 which receives the electrode assembly 3. The interior space 14 is closed only almost completely, however, by way of the first housing walls 11 and the second housing walls 12, since, as can be seen, in particular, from FIG. 2, the first end face 125 and the second end face 126 are arranged such that they are still spaced apart from one another by a spacing 15. The said spacing 15 therefore prevents direct contact of the two housing elements 4, 5 which are connected in each case to at least one pole 8, 9 of the electrode assembly 3.

Here, the at least one insulation element 10 of the battery cell 1 is arranged at least partially between the first housing element 4 and the second housing element 5 for electric insulation of the two housing elements 4, 5 from one another. Here, the insulation element 10 is arranged such that the insulation element 10 covers the first end face 125 and the second end face 126 completely. In particular, the insulation element 10 is arranged at least partially between the first end face 125 and the second end face 126, with the result that the insulation element 10 serves to maintain the spacing 15 or to not undershoot a minimum value for the spacing 15. Therefore, the insulation element 10 serves for mechanical maintenance of the spacing 15.

Figure 2A:
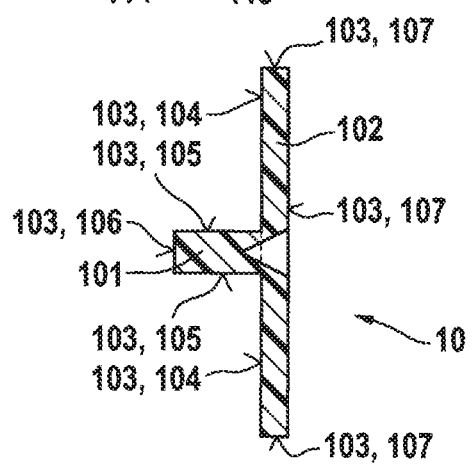
FIG. 2a shows one embodiment of a T-shaped insulation element in a sectional illustration.

The insulation element 10 which is shown in FIG. 2 is of T-shaped configuration. This is to be understood to mean that the insulation element 10, as shown in FIG. 2a, has a first part 101 which can be arranged, in particular, between the first end face 125 and the second end face 126 and therefore serves to maintain the spacing 15, and has a second part 102 which can be arranged, in particular, outside the metallic housing 2 and serves for a secure mechanical connection of the two housing elements 4, 5. Here, the dashed line is to serve for improved comprehension of the boundary between the first part 101 and the second part 102. The insulation element 10 is preferably of single-piece configuration. The first part 101 and the second part 102 of the insulation element 10 are arranged, in particular, at a right angle with respect to one another, the first part 101 being arranged centrally on the second part 102.

The insulation element 10 can preferably be connected to the first housing element 4 and the second housing element 5 by way of adhesive bonding. As a result, in each case one adhesive layer 16 is arranged between the first housing element 4 and the insulation element 10, in particular the second part 102 of the insulation element 10 of T-shaped configuration, and between the second housing element 5 and the insulation element 10, in particular the second part 102 of the T-shaped insulation element 10. By way of the connection of the insulation element 10 to the first housing element 4 and the second housing element 5, firstly the interior space 14 is closed off completely and secondly a mechanical connection can be configured between the first housing element 4 and the second housing element 5. As a result, additional fixing means for stabilizing the metallic housing 2 of the battery cell 1 can be dispensed with.

In addition, the insulation element 10 has a barrier layer 6.

As can be seen from FIG. 2a, the insulation element 10 of T-shaped configuration preferably has a plurality of surfaces 103. At least one surface 104 can be arranged adjacently with respect to one of the first outer faces 122, 124 or the first inner face 121, 123 of the metallic housing 2 of the battery cell 1, and can be connected, in particular by way of adhesive bonding, to one of the first outer faces 122, 124 or the first inner face 121, 123 of the metallic housing 2. At least one surface 105 can be arranged adjacently with respect to the first end face 125 or the second end face 126. At least one surface 106 can be arranged adjacently with respect to the interior space 14 of the battery cell 1. At least one surface 107 can be arranged adjacently with respect to the surrounding area 14 of the battery cell 1 and is also called an outer face 107. In other words, this means that only those surfaces 103 are called an outer face 107 which, after the assembly of the battery cell 1, are not connected directly to one of the first outer faces 122, 124 of the metallic housing 2 of the battery cell 1, which cover the first end face 125 or the second end face 126, or which are arranged directly adjacently with respect to the interior space 14 of the battery cell. Once again in other words, this means that only the outer faces 107 can be seen from the surrounding area 13 of the battery cell 1 after the assembly of the battery cell 1 and, in particular, before the arrangement of the barrier layer 6. That embodiment of an insulation element 10 which is shown in FIG. 2a can be used for a first embodiment of a battery cell 1 according to the invention in accordance with FIG. 2.

In the case of the first embodiment (shown in FIG. 2) of a battery cell 1 according to the invention, a barrier layer 6 is arranged on an outer face 107.

Furthermore, it can be seen from FIG. 2 that a barrier layer 6 is arranged on one of the outer faces 122, 124 of the metallic housing 2, in particular the first outer face 122 and the second outer face 124. Here, the barrier layer 6 is configured in such a way that it is arranged both on an outer face 122, 124 of the metallic housing 2 and on an outer face 107 which is adjacent with respect to the surrounding area 13. It is possible as a result to cover connecting points which lie adjacently with respect to the surrounding area 13 between the metallic housing 2 and the insulation element 10 with a barrier layer 6, which connecting points are denoted by items 17.

Furthermore, FIG. 2 shows that the insulation element 10 has at least one predetermined break point 25. In particular, as shown in FIG. 2, the insulation element 10 has two predetermined break points 25. The predetermined break points 25 are to make a defined fracture of the insulation element 10 possible above a defined pressure which prevails within the interior space 14, in order thus to make a controlled pressure dissipation possible.

Figure 3:
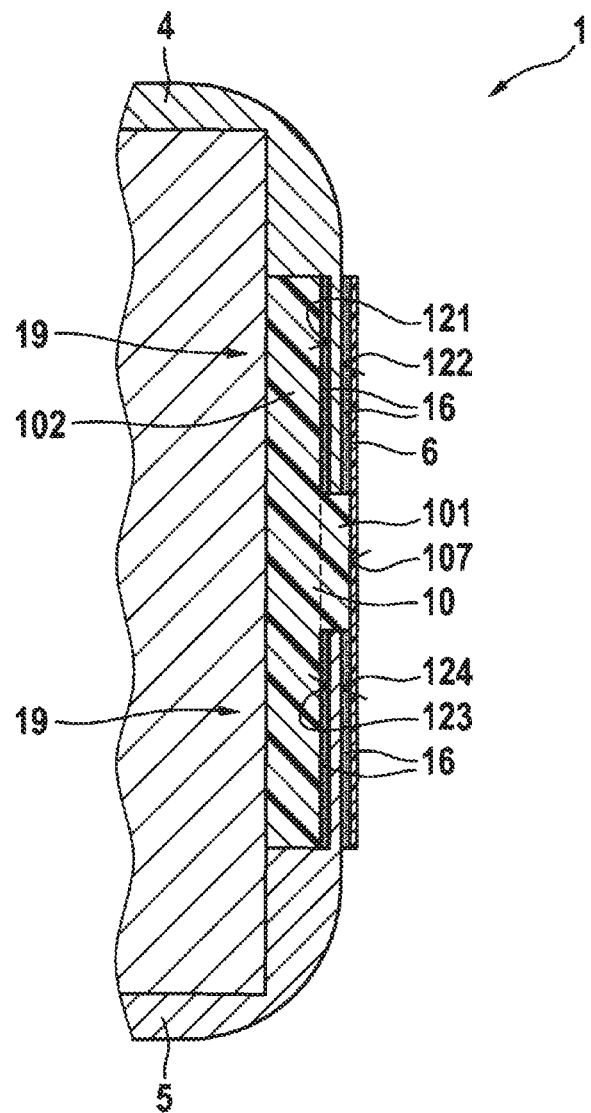
FIG. 3 shows a second embodiment of a battery cell according to the invention in a sectional illustration.

FIG. 3 shows a second embodiment of a battery cell 1 according to the invention in a sectional illustration according to the plane 7 which is shown in FIG. 1.

The second embodiment (shown in FIG. 3) of a battery cell 1 differs from the first embodiment (shown in FIG. 2) of a battery cell 1, in particular, by way of the arrangement of the insulation element 10 of T-shaped configuration which is now arranged in such a way that the second part 102 is not arranged outside the metallic housing 2, but rather within the metallic housing 2.

In particular, the insulation element 10 is connected to the first inner face 121 and the second inner face 123 by way of adhesive bonding, with the result that an adhesive layer 16 is arranged between the insulation element 10 and the first inner face 121 and the second inner face 123.

Furthermore, as can be seen from FIG. 3, the first housing element 4 and the second housing element 5 have in each case one cutout 19 which is set up for receiving the insulation element 10. In particular, the cutouts 19 are configured in such a way that they can receive the second part 102 of the insulation element 10 of T-shaped configuration which is shown in FIG. 2a. Here, the embodiment (shown in FIG. 2a) of an insulation element 10 can also be used for a second embodiment of a battery cell 1 according to FIG. 3. It is to be noted at this point that the definitions of the surfaces 104 to 107 made above still apply, with the result that the reference numerals 104 to 107 from FIG. 2a no longer apply to the second embodiment of the battery cell 1 according to FIG. 3.

Furthermore, the battery cell 1 which is shown in FIG. 3 has a barrier layer 6 which is, in particular, of planar configuration and is arranged on the first outer face 122, the second outer face 124 and the insulation element 10, in particular the outer face 107. Here, the barrier layer 6 can be connected to the first outer face 122, the second outer face 124 and the insulation element by way of adhesive bonding or heat sealing, an adhesive layer 16 being arranged in the case of adhesive bonding, as can be seen from FIG. 3.

The second embodiment which is shown in FIG. 3 has the advantage that the mechanical stability of the battery cell 1 is maintained even in the case of an increase of the pressure in the interior space 14, since the second part 102 of the insulation element 10 can absorb the forces.

Figure 4:
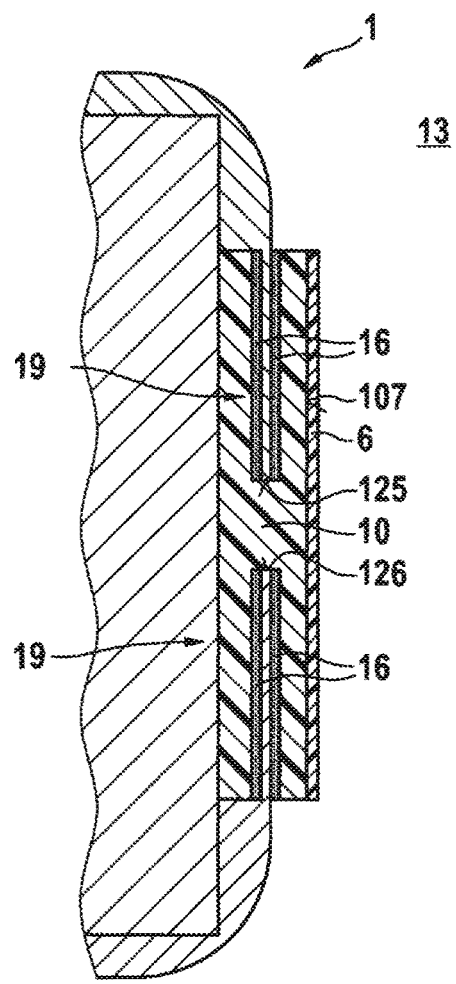
FIG. 4 shows a third embodiment of a battery cell according to the invention in a sectional illustration.

FIG. 4 shows a third embodiment of a battery cell 1 according to the invention in a sectional illustration according to the plane 7 which is shown in FIG. 1.

Here, the third embodiment (shown in FIG. 4) of a battery cell 1 differs from the first and second embodiments which are shown in FIGS. 1 and 2 substantially in that the insulation element 10 is of H-shaped configuration.

Here, the H-shaped insulation element 10 combines the arrangement (shown in FIG. 2) of the second part 102 of the T-shaped insulation element 10 outside the metallic housing 2 with the arrangement (shown in FIG. 3) of the second part 102 of the T-shaped insulation element 10 within the metallic housing 2.

Figure 4A:
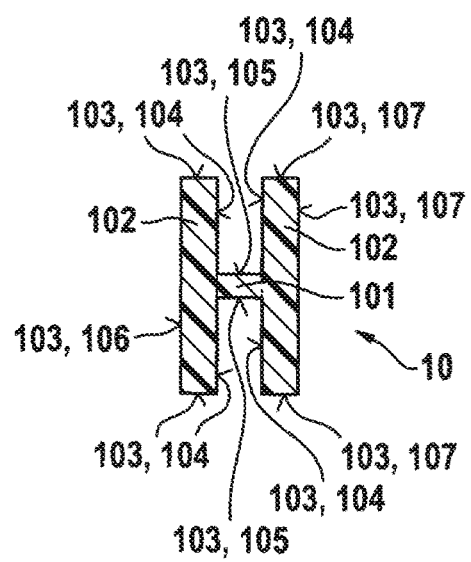
FIG. 4a shows one embodiment of an H-shaped insulation element in a sectional illustration.

FIG. 4a shows one embodiment of an insulation element 10 of H-shaped configuration. Here, the definitions of the surfaces 104 to 107 which were made in conjunction with FIG. 2a are to still apply. As can be seen from FIG. 4a, the insulation element 10 has a first part 101 which is arranged between the first end face 125 and the second end face 126, and two second parts 102 which are arranged on opposite sides of the H-shaped insulation element 10, the one of the two second parts 102 being arranged outside the metallic housing 2 and the other of the two second parts 102 being arranged within the metallic housing 2 and, in particular, being received in cutouts 19.

As has already been described, the insulation element 10 of H-shaped configuration can be connected to the first housing element 4 and/or the second housing element 5 by way of adhesive bonding or heat sealing, with the result that an adhesive layer 16 is arranged, in particular a plurality of adhesive layers 16 are arranged, between the first housing element 4 and/or the second housing element 5 and the insulation element 10 of H-shaped configuration.

The insulation element 10 has an above-described barrier layer 6 on the outer face 107 of the insulation element 10, which outer face 107 is adjacent with respect to the surrounding area 13.

The H-shaped insulation element 10 serves for reliable electric insulation between the two housing elements 4, 5 and can at the same time ensure a stable mechanical connection between the two housing elements 4, 5.

Figure 5:
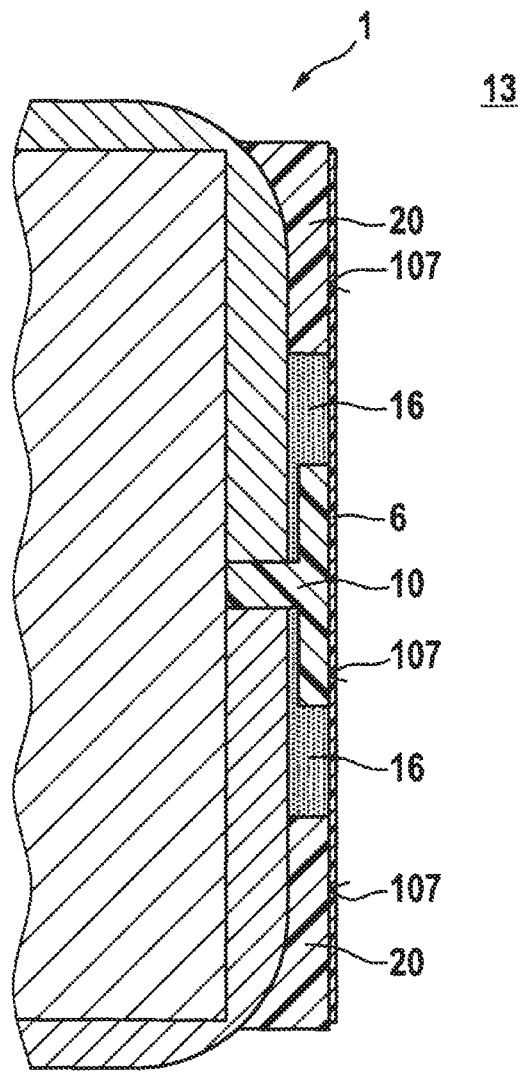
FIG. 5 shows a fourth embodiment of a battery cell according to the invention in a sectional illustration.

FIG. 5 shows a fourth embodiment of a battery cell 1 according to the invention in a sectional illustration according to the plane 7 which is shown in FIG. 1.

The fourth embodiment (shown in FIG. 5) of a battery cell 1 differs from the previously described embodiments in that, furthermore, the battery cell 1 additionally has at least one further insulation element 20. The fourth embodiment (shown in FIG. 5) of a battery cell 1 has, in particular, two further insulation elements 20. The at least one further insulation element 20 serves to enlarge the insulated region of the battery cell 1 with respect to the surrounding area 13.

Furthermore, the fourth embodiment has a barrier layer 16 which is arranged on an outer face 107 of the at least one insulation element 10 and on an outer face 107 of the two further insulation elements 20.

Furthermore, it can be seen from FIG. 5 that the at least one insulation element 10 and the at least one further insulation element 20 are separated by way of an adhesive layer 16 which serves to connect the metallic housing 2 to the barrier layer 6.

Figure 6:
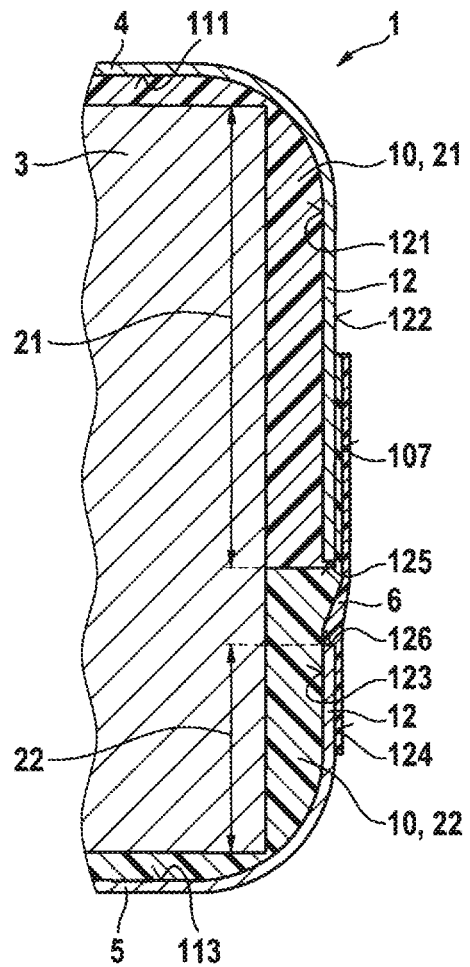
FIG. 6 shows a fifth embodiment of a battery cell according to the invention in a sectional illustration.

FIG. 6 shows a fifth embodiment of a battery cell 1 according to the invention in a sectional illustration according to the plane 7 which is shown in FIG. 1.

In contrast to the above-described embodiments, the first housing element 4 and the second housing element 5 are not of identical configuration. In particular, the second housing wall 12 of the first housing element 4 and the second housing wall 12 of the second housing element 5 differ, a length 21 which characterizes the depth of the first housing element 4 of half shell-shaped configuration being greater, as can be seen from FIG. 6, than a length 22 which characterizes the depth of the second housing element 5 of half shell-shaped configuration. The length 21 is preferably twice as long as the length 22.

As can be seen from FIG. 6, the battery cell 1 has two insulation elements 10. In particular, the first housing element 4 has a first insulation element 21, and the second housing element 5 has a second insulation element 22. Here, the first insulation element 21 is arranged between the inner face 111 and the electrode assembly 3 and between the first inner face 121 and the electrode assembly 3. Here, the second insulation element 22 is arranged between the inner face 113 and the electrode assembly 3 and between the second inner face 123 and the electrode assembly 3. Here, however, the positive pole 8 and the negative pole 9 of the electrode assembly 3 are nevertheless connected electrically to the first housing element 4 and the second housing element 5, respectively.

Furthermore, the second insulation element 22 is configured in such a way that the second insulation element 22 covers the first outer side 122 at least partially. Furthermore, the second insulation element 22 is arranged between the first end face 125 and the second end face 126 and thus serves to ensure the electric insulation.

Furthermore, it can be seen from FIG. 6 that the battery cell 1 has a barrier layer 6. Here, the barrier layer 6 is arranged on the second outer face 124 of the second housing wall 12 of the second housing element 5 and on the outer face 107 of the second insulation element 22. As a result, a diffusion of solvent or moisture through the first insulation element 21 and/or the second insulation element 22 can be reduced.

Figure 6A:
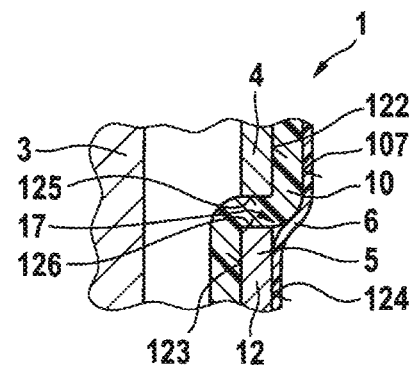
FIG. 6a shows a further embodiment of a battery cell according to the invention in a sectional illustration.

FIG. 6a shows a further embodiment of a battery cell 1 according to the invention in a sectional illustration.

The battery cell 1 which is shown in FIG. 6a has an insulation element 10 which is configured in such a way that the insulation element 10 is arranged between the first end face 125 and the second end face 126, and that the insulation element 10 is arranged on the second inner face 123 and on the first outer face 122. As a result, secure electric insulation and a reliable mechanical connection can be provided in a simple way.

Furthermore, the battery cell 1 according to FIG. 6a has a barrier layer 6 which is arranged on the outer face 107 of the insulation element 10 and on the second outer face 124 of the second housing wall 12 of the second housing element 5. As a result, reliable diffusion protection can be ensured which, in particular, reliably secures connecting points 17. It goes without saying that it is possible to connect the insulation element 10 and the barrier layer 6 to the metallic housing 2 and/or the insulation element 10 by way of adhesive bonding or heat sealing, as described above.

All embodiments which are described by the drawings serve only for improved comprehension of the invention and can optionally be combined as desired with one another and are not intended to restrict the invention in any way.

What is claimed is:

1. A battery cell, having a metallic housing (2), an electrode assembly (3) being received in the metallic housing (2), and the metallic housing (2) having a first housing element (4) which is connected electrically to a positive pole (8) of the electrode assembly (3) and a second housing element (5) which is connected electrically to a negative pole (9) of the electrode assembly (3), the battery cell (3) having, furthermore, at least one insulation element (10) which is configured for insulating the two housing elements (4, 5) from one another electrically and is arranged between the two housing elements (4, 5), characterized in that the at least one insulation element (10) has at least one barrier layer (6), wherein the insulation element has at least one predetermined break point that is configured to fracture at a pressure threshold to enable a controlled pressure dissipation of the battery cell.

2. The battery cell according to claim 1, characterized in that at least one barrier layer (6) is arranged on an outer face (122, 124) of the metallic housing (2).

3. The battery cell according to claim 1, characterized in that the at least one barrier layer (6) is configured from a plastic/aluminum composite.

4. The battery cell according to claim 1, characterized in that the at least one barrier layer (6) is arranged on an outer face (107) of the at least one insulation element (10), which outer face (107) is adjacent to a surrounding area (13) of the battery cell (1).

5. The battery cell according to claim 1, characterized in that the barrier layer (6) is integrated into the at least one insulation element (10).

6. The battery cell according to claim 1, characterized in that the first housing element (4) and/or the second housing element (5) are/is of half shell-shaped configuration.

7. The battery cell according to claim 6, the first housing element (4) of half shell-shaped configuration having a first end face (125), a first inner face (121) and a first outer face (122), and the second housing element (5) of half shell-shaped configuration having a second end face (126), a second inner face (123) and a second outer face (124), characterized in that the at least one insulation element (10) covers the first and second end face (125, 126) completely and covers at least one inner face (121, 123) and at least one outer face (122, 124) of the two housing elements (4, 5) at least partially.

8. The battery cell according to claim 1, characterized in that the at least one insulation element (10) is of H-shaped or T-shaped configuration.

9. The battery cell according to claim 1, characterized in that the pressure threshold at which the at least one predetermined break point (25) configured to fracture is below a fracture pressure threshold of the metallic housing (2).

10. The battery cell according to claim 1, characterized in that the electrode assembly (3) is configured as an electrode stack or as an electrode winding.

11. The battery cell according to claim 1, wherein the battery cell is a lithium-ion battery cell.

12. The battery cell according to claim 1, characterized in that the at least one barrier layer (6) is configured from a polyethylene/aluminum composite.

13. The battery cell according to claim 1, characterized in that the pressure threshold at which the at least one predetermined break point (25) which is configured to fracture is a pressure of 6 bar.

14. The battery cell according to claim 1, wherein the insulation element has a v-shaped notch, wherein the predetermined break point is positioned adjacent the v-shaped notch.

15. The battery cell according to claim 1, wherein the insulation element has a first part and a second part in a T-shaped arrangement, wherein the first part extends between a first end face and a second end face of the housing, and the second part is arranged outside the housing, and wherein the insulation element further includes a v-shaped notch that extends through the second part and partially into the first part, and wherein the predetermined break point is formed on either side of the v-shaped notch adjacent a junction between the first part and the second part.

16. The battery cell according to claim 1, wherein the predetermined break point is a thinnest point of the insulation element.

17. A battery having a battery cell (1) according to claim 1.

18. A method for producing a battery cell according to claim 1, the method comprising arranging the barrier layer (6) on an outer face (107) of the at least one insulation element and/or on an outer face of the metallic housing (122, 124).

19. The method for producing a battery cell according to claim 18, characterized in that the barrier layer (6) is connected to the outer face (107) of the at least one insulation element (107) and/or the outer face (122, 124) of the metallic housing (2) by way of heat sealing, adhesive bonding or adhesive tapes.

* * * * *